United States Patent
Lysyansky et al.

[11] Patent Number: 6,117,078
[45] Date of Patent: Sep. 12, 2000

[54] VIRTUAL VOLUMETRIC PHANTOM FOR ULTRASOUND HANDS-ON TRAINING SYSTEM

[75] Inventors: Peter Lysyansky; Evgeny Drapkin, both of Haifa, Israel

[73] Assignee: General Electric Company, Milwaukee, Wis.

[21] Appl. No.: 09/224,651

[22] Filed: Dec. 31, 1998

[51] Int. Cl.[7] .................................. A61B 8/00; G09B 9/00
[52] U.S. Cl. ............................................ 600/437; 434/262
[58] Field of Search ...................................... 600/437, 443; 73/1.82; 434/6, 257, 262, 264, 267, 274

[56] References Cited

U.S. PATENT DOCUMENTS

| | | | |
|---|---|---|---|
| 5,230,339 | 7/1993 | Charlebois | 73/1.82 |
| 5,540,229 | 7/1996 | Collet-Billon et al. | 600/443 |
| 5,609,485 | 3/1997 | Bergman et al. | 434/262 |
| 5,654,509 | 8/1997 | Miele et al. | 73/602 |
| 5,782,766 | 7/1998 | Weng et al. | 600/443 |
| 5,827,942 | 10/1998 | Madsen et al. | 73/1.82 |

*Primary Examiner*—Francis J. Jaworski
*Attorney, Agent, or Firm*—McAndrews, Held & Malloy; Christian G. Cabou; Phyllis Y. Price

[57] ABSTRACT

A method and apparatus for providing a virtual volumetric ultrasound phantom to construct an ultrasound training system from any ultrasound system (hereafter "the ultrasound training system").

The ultrasound system and method retrieve and display previously stored ultrasound data to simulate an ultrasound scanning session. A real ultrasound system acquires an image of an ultrasound phantom. The ultrasound image comprises ultrasound echo data for an image/scan plane representing a cross-section or partial volume of the ultrasound phantom. The ultrasound image is analyzed to identify image attributes that are unique for each image/scan plane. A portion of the previously stored data that corresponds to the image attributes is retrieved and displayed. In one embodiment, actual position and orientation of the acquired image/scan plane with respect to a known structure within the ultrasound phantom are determined by processing the image/scan plane to obtain a number of geometrical image parameters. Position and orientation of the image/scan plane are calculated from the image parameters using formulas based on a known three dimensional structure within the phantom. The determination of actual image/scan plane position and orientation may be enhanced using image de-correlation techniques. Retrieval of the stored data may be based upon the calculated position and orientation or on the obtained image parameters. In another embodiment of the present invention, relative changes in image/scan plane position and orientation with respect to an initial reference position and orientation are determined by processing successive acquired ultrasound images using image de-correlation techniques. In another embodiment of the present invention, the identity of each pixel or voxel within the image/scan plane is determined and a set of corresponding pixels or voxels of stored data are retrieved for display.

20 Claims, 7 Drawing Sheets

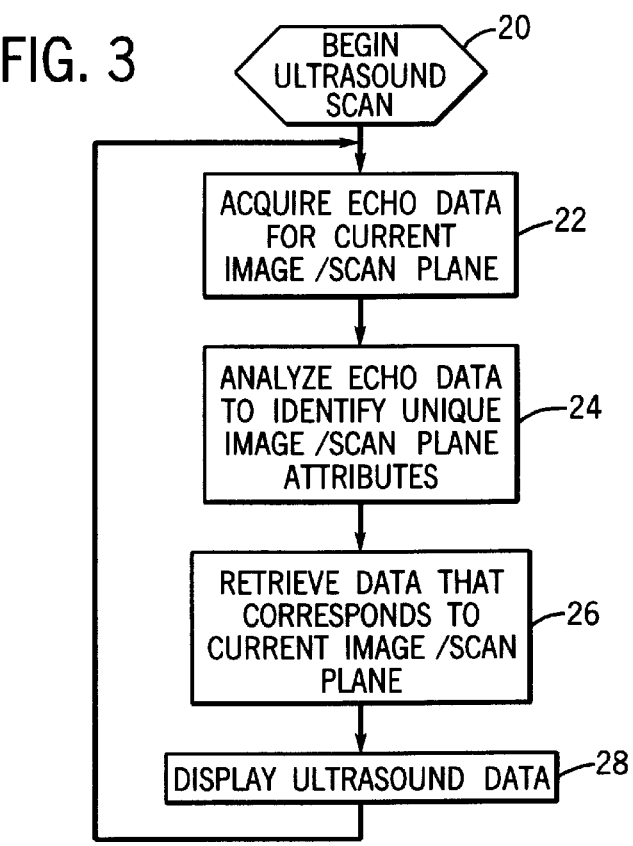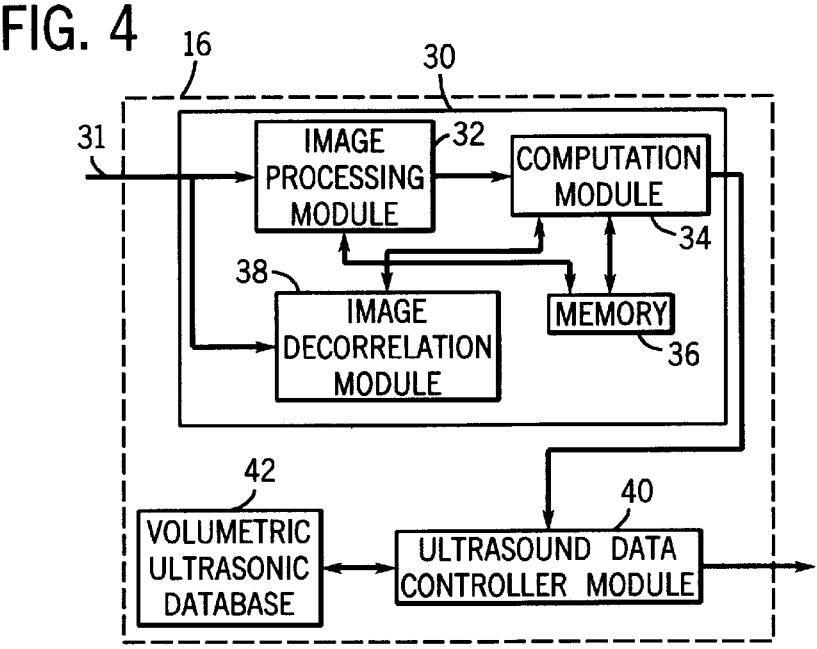

FIG. 6
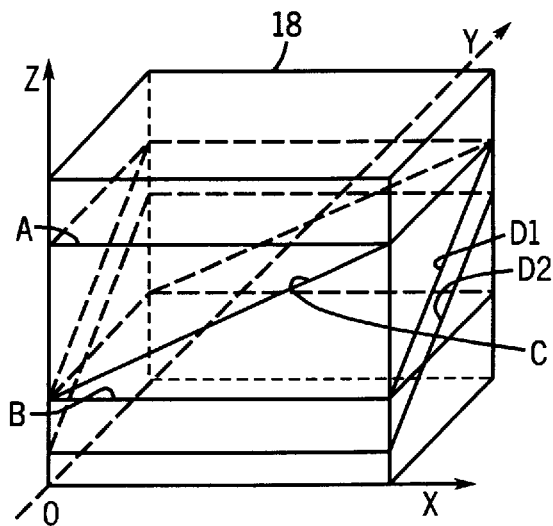
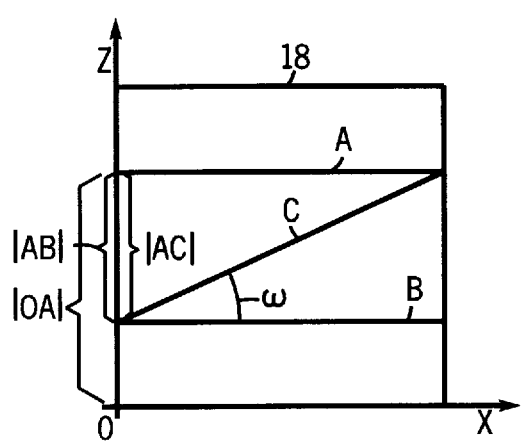
FIG. 7a
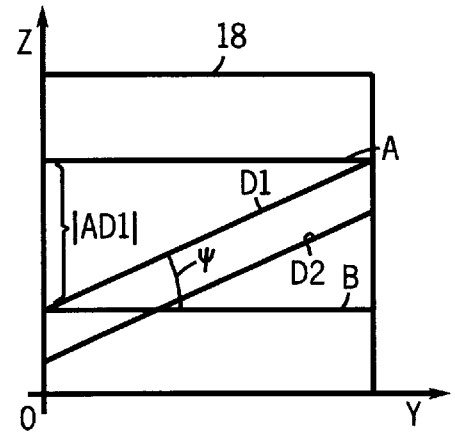
FIG. 7b

VIRTUAL VOLUMETRIC PHANTOM FOR ULTRASOUND HANDS-ON TRAINING SYSTEM

CROSS-REFERENCE TO RELATED APPLICATIONS

None

STATEMENT REGARDING FEDERALLY SPONSORED RESEARCH OR DEVELOPMENT

Not applicable.

BACKGROUND OF THE INVENTION

The present invention relates to ultrasound systems which measure and image anatomical structures. More particularly, the present invention relates to a method and apparatus for simulating an ultrasound scan wherein the displayed image is spatially associated with a contemporaneous scan of an ultrasound phantom, to be used in an ultrasound training system.

Ultrasound imaging systems are highly complex and sophisticated devices. System operators must be specially trained in the operation of ultrasound imaging systems in order to ensure that accurate and useful information is obtained. The most effective training in the field of ultrasound imaging is the "hands-on" method—a real scan using a real ultrasound system. Ultrasound phantoms of human organs, such as the liver, kidneys and heart, could be constructed to mimic the live model. This, however, would require the construction of many different phantoms to account for the large variations of pathological and normal cases of a given organ. Furthermore, an accurate construction of such a physical phantom would be complicated and expensive. A training system that provides a hands-on experience with a wide variety of anatomical structures and conditions without requiring a large variety of complicated and expensive ultrasound phantoms would be useful in the training of ultrasound system operators.

Medical reproduction systems have been proposed wherein real ultrasound data is collected from real ultrasound scans and stored in a database. The stored data is then played back on a simulated ultrasound unit. One such system is disclosed in U.S. Pat. No. 5,609,485. In this system, the operator of the simulated ultrasound unit manipulates a simulated ultrasound probe over a transmitter which may be attached to a simulated body. The transmitter and a receiver in the simulated probe are used by a "six degrees of freedom" unit to determine the position of the simulated probe with respect to the simulated body. The transmitter/receiver pair have three co-located antennae each which operate on magnetic field principals. A processor determines what portion of the stored ultrasound data corresponds to the current position of the probe. A display unit on the simulated ultrasound unit is operable to display an output based on the portion of the stored ultrasound data determined by the processor. The "six degrees of freedom" unit allows the medical reproduction system to perform as an interactive training tool, providing the opportunity to explore the anatomy as if an actual patient were present.

The medical reproduction system described above has several disadvantages. One disadvantage is that an actual ultrasound system is not used in the training mode for performing ultrasound scans or playing back stored ultrasound data. Other disadvantages arise from the positioning device or "six degrees of freedom" unit of U.S. Pat. No. 5,609,485. A disadvantage of using independently operating positioning devices such as the kind described above is that use of separate positioning hardware adds to the level of complexity and cost of the system, such as an ultrasound training system. A further disadvantage is that the magnetic field used to detect probe position may interfere with, or be affected by, the imaging equipment. Still further, such positioning devices only measure position with respect to the transmitter, which is mounted on or near the imaged object. If the transmitter is not mounted in a proper position with respect to the imaged object, the probe position indicated by the positioning device may be different from the actual probe position. Under such circumstances the simulated ultrasound unit might display an image that is not appropriate or expected for the actual position of the simulated probe over the simulated body.

A need remains for an improved interactive ultrasound training system overcome the above-identified difficulties. It is an object of the present invention to meet this need.

SUMMARY OF THE INVENTION

It is an object of the preferred embodiment of the present invention to provide virtual volumetric ultrasound phantom to construct an ultrasound training system from any ultrasound system (hereafter "the ultrasound training system").

It is a further object of a preferred embodiment of the present invention to provide the ultrasound training system that is capable of playing back stored ultrasound data in an interactive manner.

It is a further object of a preferred embodiment of the present invention to provide an interactive ultrasound training system using an actual ultrasound system.

It is a further object of a preferred embodiment of the present invention to provide an ultrasound training system that is capable of playing back stored ultrasound data that corresponds to an image/scan plane of a simulated body or ultrasound phantom.

It is a further object of a preferred embodiment of the present invention to provide an ultrasound training system that displays actual stored ultrasound images based on the content of an echo signal received from an ultrasound phantom.

It is another object of a preferred embodiment of the present invention to provide an ultrasound training system that is capable of playing back stored ultrasound data that corresponds spatially to the position and orientation of the image/scan plane of a contemporaneous ultrasound scan of an ultrasound phantom.

It is another object of a preferred embodiment of the present invention to provide an ultrasound training system that analyzes echo signals acquired through a contemporaneous ultrasound scan of an ultrasound phantom and displays stored ultrasound data according to a one-to-one relation between the acquired image/scan plane of the ultrasound phantom and an image/scan plane of the stored ultrasound data.

It is another object of a preferred embodiment of the present invention to provide an ultrasound system that is capable of determining image/scan plane position and orientation without the use of a separate positioning device and associated hardware.

It is another object of a preferred embodiment of the present invention to provide an imaging system that provides position and orientation information in an efficient and economical manner.

These and other objects of the present invention are provided by a system and method for playing back stored ultrasound data that corresponds to an image/scan plane acquired through a contemporaneous ultrasound scan of a simulated body or ultrasound phantom. An ultrasound image/scan plane of an ultrasound phantom comprising a cross-section or partial volume of the phantom is acquired through conventional ultrasound techniques. The acquired image/scan plane is processed to identify one or more attributes of the image/scan plane that can be used to retrieve and construct a corresponding image/scan plane of stored ultrasound data. The corresponding stored ultrasound data is retrieved from an database and an image representing the retrieved ultrasound data is displayed.

In one embodiment of the present invention, the acquired image/scan plane may be processed to determine the information regarding the position and orientation of the image/scan plane. The image/scan plane position and orientation information is then used to retrieve corresponding ultrasound data from an ultrasound database. The retrieved ultrasound data spatially corresponds to or is registered with the image/scan plane of the ultrasound phantom that is currently being acquired. The position and orientation information may be the actual position and orientation of the image/scan plane within the phantom or may be relative position and orientation with respect to a reference or starting image/scan plane.

Actual position and orientation may be determined with respect to a known three dimensional structure embodied in the ultrasound phantom. An ultrasound phantom is generally a block of material suitable for imaging by an ultrasound system. The ultrasound probe acquires a cross sectional or partial volume image of the ultrasound phantom. The image is processed to obtain a set of geometrical image parameters. Position and orientation of the image/scan plane is calculated from the image parameters using formulas based on the known three dimensional structure. The three dimensional structure of the ultrasound phantom may be designed such that for each position and orientation of the ultrasound probe, located on or above the upper face of the phantom, a unique ultrasound image and a unique set of image parameters are acquired. Such structure may comprise a number of planes of a material embedded within the ultrasound phantom that will provide an ultrasound echo characteristic that sharply contrasts with that of the remaining phantom material. The determination of actual image/scan plane position and orientation may employ an image de-correlation algorithm to enhance the detection of small changes in image/scan plane position and orientation. Error accumulations created by de-correlation may be avoided by reevaluating the results obtained from the original calculation of image/scan plane position and orientation.

Alternatively, the calculation of actual image/scan plane position and orientation need not be completed. Because a unique set of image parameters are acquired for each position and orientation of the image/scan plane, each set of image parameters may correspond to an image/scan plane of the stored ultrasound data.

In an alternative embodiment of the present invention, the actual position and orientation of the image/scan plane within the ultrasound phantom need not be determined. In this embodiment, the only position and orientation information that needs to be determined is the relative change in image/scan plane position and orientation with respect to an initial reference image/scan plane position and orientation. Relative changes in position and orientation are determined using an image de-correlation algorithm. In this embodiment, a known structure within the phantom is not required.

In a further alternative embodiment of the present invention, neither actual, nor relative changes in, image/scan plane position and orientation must be determined. Instead, a one-to-one correspondence between the pixels or voxels within a cross sectional or partial volume image of an ultrasound phantom and the pixels or voxels of the ultrasound data stored in the ultrasound database is used. The phantom is divided into a number of volumetric areas or voxels each providing a unique echo characteristic, such as echo amplitude. The current image/scan plane is processed to identify the subset of voxels within the image/scan plane. The ultrasound data corresponding to the identified subset of voxels within the image/scan plane are then retrieved from the ultrasound database for display.

The ultrasound system according to a preferred embodiment of the present invention may also provide temporal correspondence between the displayed ultrasound image and the elapsed time of the simulated ultrasound session. In this embodiment the ultrasound database includes time-stamped ultrasound data. A timer times the elapsed time from the beginning of the simulated ultrasound scanning session. The temporally corresponding ultrasound data is then retrieved from the ultrasound database for display. In this manner, an ultrasound image of a moving organ, such as the heart, can be simulated.

Other objects, features, and advantages of the present invention will be apparent from the accompanying drawings and from the detailed description that follows below.

BRIEF DESCRIPTION OF THE DRAWINGS

FIG. 3 illustrates a flow chart of a process for retrieving and displaying ultrasound data that corresponds to an image/scan plane acquired through a contemporaneous ultrasound scan.

FIG. 4 illustrates a block diagram of a registration module of an ultrasound training system according to a preferred embodiment of the present invention.

FIG. 6 illustrates an orthogonal view of an exemplary ultrasound phantom according to a preferred embodiment of the present invention.

FIG. 7a illustrates a cross sectional view in the ZOX plane of the exemplary ultrasound phantom of FIG. 6 according to a preferred embodiment of the present invention.

FIG. 7b illustrates a cross sectional view in the ZOY plane of the exemplary ultrasound phantom of FIG. 6 according to a preferred embodiment of the present invention.

DETAILED DESCRIPTION OF THE PREFERRED EMBODIMENT

A method and apparatus are described for simulating an ultrasound scan by playing back stored actual ultrasound data that corresponds spatially to an ultrasound image/scan plane of an ultrasound phantom comprising a cross-section or partial volume of the phantom acquired through conventional ultrasound techniques. In the following description, numerous specific details are set forth in order to provide a thorough understanding of the preferred embodiment of the present invention. It will be apparent, however, to one of ordinary skill in the art that the present invention may be practiced without these specific details.

Figure 1:
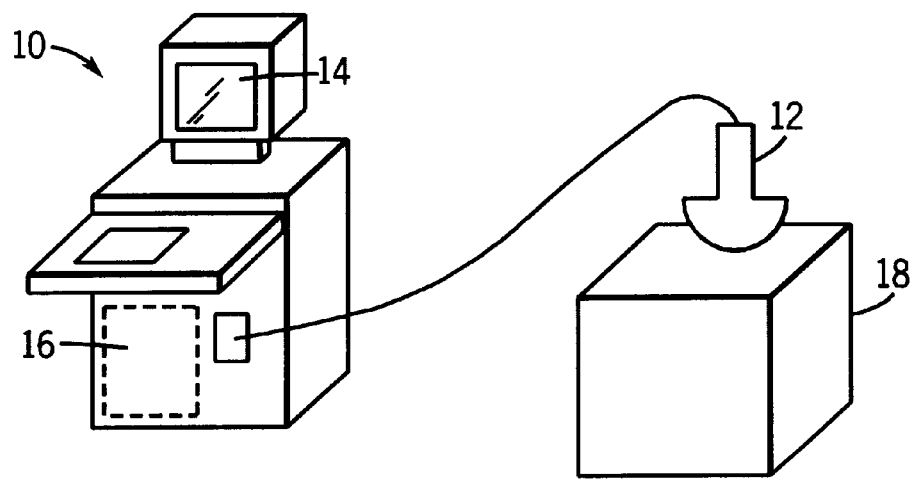
FIG. 1 illustrates an ultrasound training system according to a preferred embodiment of the present invention.
Figure 2:
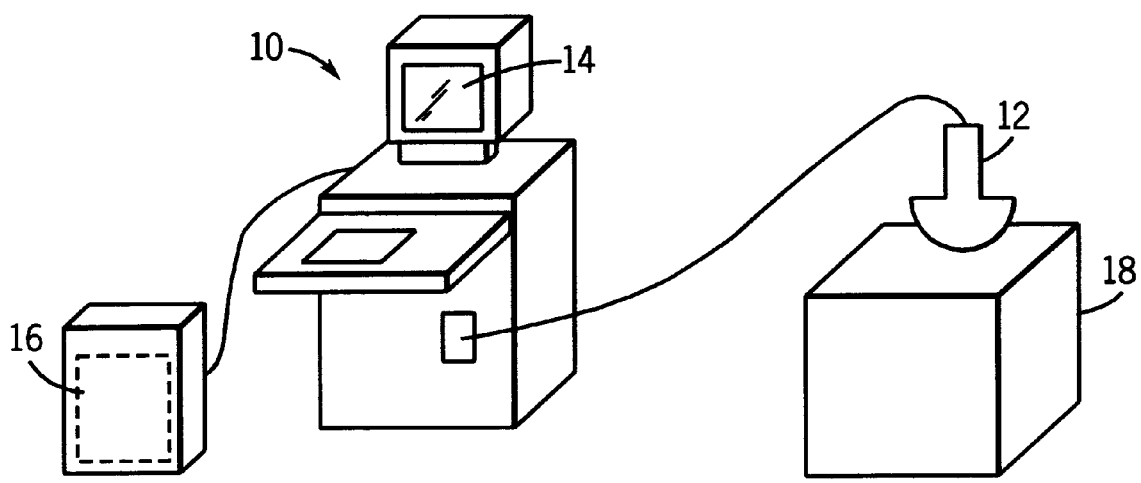
FIG. 2 illustrates an ultrasound training system according to a preferred embodiment of the present invention.

An ultrasound system according to a preferred embodiment of the present invention is shown in FIG. 1. Ultrasound system 10 acquires an image via ultrasound probe 12 of an ultrasound phantom 18 by employing conventional ultrasound imaging techniques. For example, ultrasound system 10 may acquire image information by transmitting a series of ultrasound waves into the ultrasound phantom 18 and then detecting the ultrasound echoes reflected therefrom. The ultrasound system 10 may acquire echoes for a number of two-dimensional sub-sections or pixels (for example, 256×256) within an image frame or image/scan plane comprising a slice (cross-section or partial volume) of the phantom 18 within the ultrasound scan plane. The ultrasound system 10 then displays the image information, such as in a B-mode image. Typically, echo value data for each image/scan plane is processed and displayed on video monitor 14 by converting the echo value datum for each pixel into a value indicating display brightness. According to the preferred embodiment of the present invention, the echo value data acquired during an ongoing ultrasound scan is not displayed. Instead, the echo value data for each image/scan plane is processed by an image registration module 16 and ultrasound data that spatially (and temporally, as the case may be) corresponds to the image/scan plane is retrieved from an ultrasound database for display. The image registration module 16 may comprise hardware and/or software operating within ultrasound system 10, or, as illustrated in FIG. 2, may comprise hardware and/or software within a separate unit that can be connected to ultrasound system 10.

According to the preferred embodiment of the present invention, the ultrasound database may comprise a volumetric ultrasonic database ("VUDB"). The VUDB may include data for one or more of the following applications or modes: m-mode, b-mode, color/power Doppler mode, tissue velocity imaging, spectral PW, CW and HPRF Doppler mode, multigated spectral Doppler mode, 3D grayscale imaging in various visualization modes, 3D color/power Doppler imaging, synthetic data, other medical imaging modalities such as CT or MRI and/or any combination of the above applications or modalities. The VUDB may include data for a complete three dimensional area of the human body or for individual organs and may include time stamped data. The data may be stored as a number of voxels of data (a voxel of data defines the ultrasound data values for a single cubic region) and may include for each voxel of data an indication of the location of the volumetric region within the human body or organ for which the voxel of data corresponds (i.e., the location from which the voxel of data was collected). The data may be collected and stored in any known manner. An example of a system for collecting ultrasound data for a complete three dimensional region is disclosed in U.S. Pat. No. 5,609,485.

According to a preferred embodiment of the present invention, the ultrasound phantom 18, as more fully explained herein, may contain an internal three dimensional structure. The size and shape of the internal three dimensional structure, including distances and angles between structural elements, are known to the ultrasound system 10. These known quantities are referred to herein as geometric characteristics.

As illustrated generally in FIG. 3, an ultrasound scanning session begins (step 20) and the ultrasound system 10 acquires ultrasound echo data for an image/scan plane (step 22) of the ultrasound phantom 18 via probe 12. The image registration module 16, as more fully explained herein, analyzes echo data to identify one or more image/scan plane attributes (step 24) and retrieves from the VUDB ultrasound data that corresponds to the current image/scan plane (step 26). An image representing the retrieved ultrasound data is then displayed on the monitor 14.

In one embodiment, image registration module 16 includes a position and orientation module 30 (referred to herein as "PO module 30"). The PO module 30 determines the current position and orientation of the image/scan plane by first obtaining through image processing a number of geometrical image parameters corresponding to angles and distances between structural lines within the image/scan plane. The position and orientation of the image/scan plane within the phantom 18 is then calculated from the obtained image parameters using predetermined formulas and geometric characteristics that correspond to the known three dimensional structure within the phantom 18. The result of the calculation of position and orientation may be enhanced by using image de-correlation techniques to detect small changes in position and orientation. The output of PO module 30 may be the three dimensional (x,y,z) position of the uppermost and center pixel or voxel in the image/scan plane and the orientation of image/scan plane with respect to a coordinate system associated with phantom 18. The output of PO module 30 is then used by an ultrasound data controller module to retrieve spatially corresponding ultrasound data from the VUDB. The retrieved data may then be displayed on the display 14 of the ultrasound system 10.

FIG. 4 illustrates a registration module 16 including a PO module 30 according to one embodiment of the present invention, an ultrasound data controller 40 and a VUDB 42. PO module 30 includes an image processing module 32, a computation module 34 and a memory 36, and may include an image de-correlation module 38. The image processing module 32 receives echo value data from the ultrasound system 10 over line 31 and performs image processing on each image frame or image/scan plane of echo value data to obtain a set of image parameters. Information, such as geometric characteristics and formula, stored in memory 36 is used by the image processing module 32 to identify, in each image frame, elements of the internal structure of the phantom 18. The image parameters determined by the image processing module 32, and geometric characteristics and formulas stored in memory 36 are then used by the computation module 34 to calculate the current image/scan plane position and orientation. Optimally, the image de-correlation module 38 may be used to enhance the accuracy of the position and orientation determined by the computation module 34 by processing successive image frames using known image de-correlation techniques. The output of PO module 30, which is the current image/scan plane position and orientation with respect to the imaged structure, is then used by the ultrasound data controller module 40 to retrieve the spatially corresponding ultrasound data from the VUDB 42.

According to an alternative embodiment of the present invention, the PO module 30 of registration module 16 may comprise only an image de-correlation module 38, or, alternatively, image processing module 32 and computation module 34 may be selectably bypassed. In this embodiment, the output of the PO module 30 would be the relative change in image/scan plane position and orientation between successive image frames of echo value data as determined by the image de-correlation module 38. A starting position and orientation of the image/scan plane and a corresponding data set would be assumed. For example, the starting position and orientation for the probe might be assumed to be the center of the top surface of the phantom 18 with the focal axis of the probe pointing straight down into the phantom 18 and the corresponding data set may be a partial volume ultrasound image of a human body as seen with an ultrasound probe in the same central position and orientation.

In a further alternative embodiment of the present invention, the image registration module 16 does not include a PO module 30 as neither actual, nor relative changes in, image/scan plane position and orientation must be determined. Instead, the image registration module 16 may include hardware and/or software adapted to identify each pixel or voxel within the image/scan plane. The phantom 18 is divided into a number of volumetric areas or voxels each providing a unique echo characteristic, such as echo amplitude. A one-to-one correspondence between the pixels or voxels of the ultrasound phantom 18 and the pixels or voxels of the ultrasound data stored in the ultrasound database is predefined. The current image/scan plane is processed to identify the subset of voxels within the image/scan plane. The ultrasound data corresponding to the identified subset of voxels within the image/scan plane are then retrieved from the ultrasound database for display.

Figure 5A:
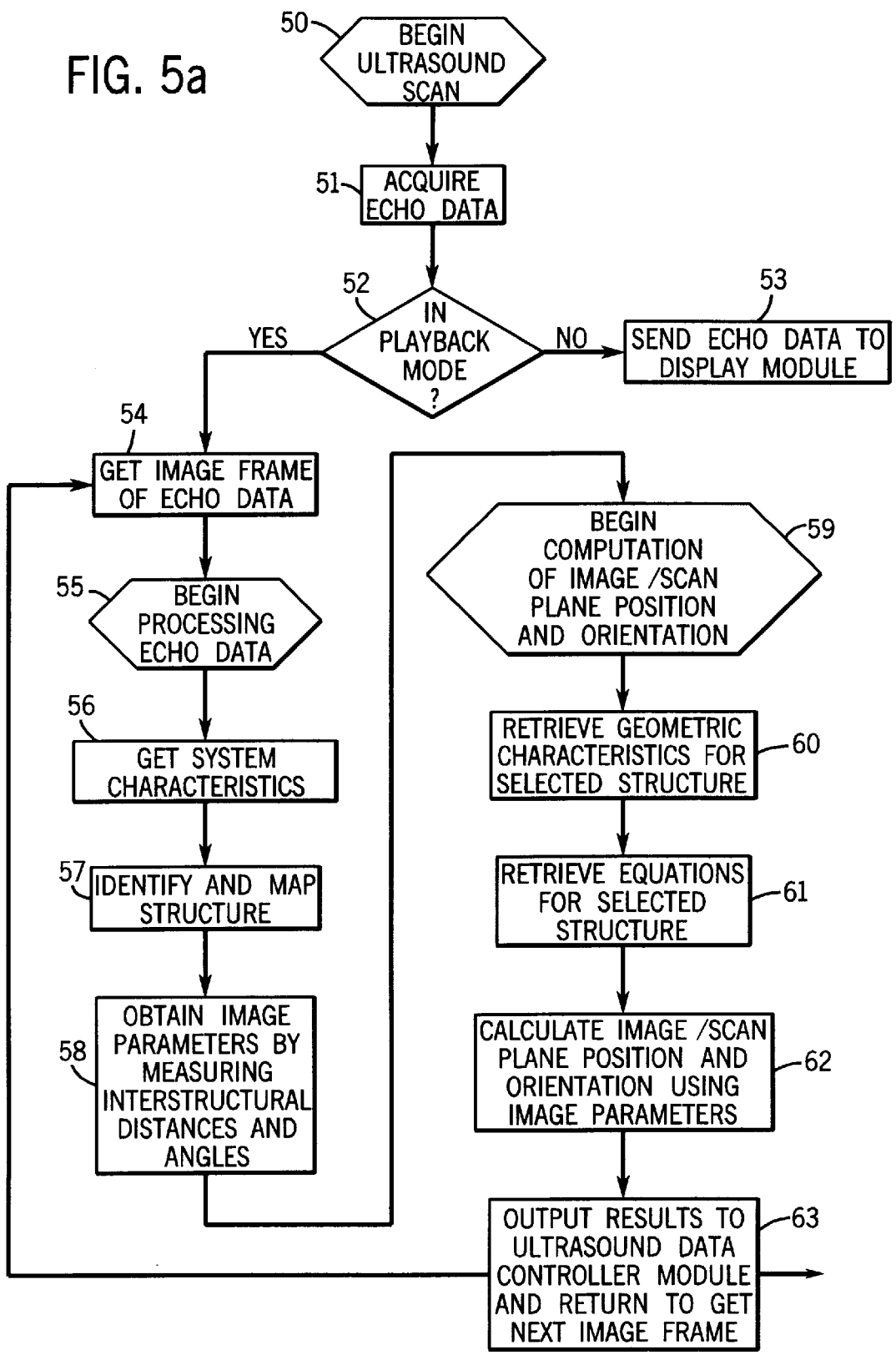
FIG. 5a illustrates a flow chart of a process for determining image/scan plane position and orientation of in an ultrasound training system according to a preferred embodiment of the present invention.

FIG. 5a is a flow chart of an exemplary procedure carried out by the ultrasound system 10 for determining image/scan plane position and orientation according to a preferred embodiment of the present invention. An ultrasound scanning session is initiated (step 50) and echo data is acquired (step 51) by passing the ultrasound probe 12 over the phantom 18. The acquired echo data is sent to the PO module 30. At step 52 a decision is made. If the ultrasound system 10 is not in the training or playback mode, the echo data is sent to the display module for display (step 53). If the ultrasound system 10 is in the training or playback mode, the echo data is sent to the PO module 30 of the image registration module 16. The PO module 30 obtains an image frame of echo data (step 54) and begins the image processing routine (step 55). First, the current system characteristics are detected by image processing module 32 (step 56). For example, the type of probe, scan depth, focal zone and gain may be considered.

Next, elements of the internal structure of the imaged object (phantom) are identified and mapped by the image processing module 32 (step 57). Structural elements will appear as a series of lines within the image frame. Individual lines are recognized by the image processing module 32 as corresponding to a specific structural element based on predetermined knowledge of the internal structure. For example, the thickness of a structural element, the use of parallel duplicate structures and/or the arrangement of the structure may be used by the image processing module 32 to distinguish one structural element from another. The lines may be defined with respect to a two dimensional coordinate system in the plane of the ultrasound scan with one axis of the coordinate system parallel to the probe's center axis. The origin of the coordinate system may be at a point adjacent to the probe face along the probe's center axis. Once the lines are identified and mapped by the image processing module 32, the image parameters are obtained by image processing module 32 by measuring inter-structural distances and angles (step 58). The obtained image parameters are sent to the computation module 34 to begin the computation of image/scan plane position and orientation (step 59). The computation module 34 retrieves from memory 36 the geometric characteristics (step 60) and the appropriate equations (step 61) that correspond to the structure being imaged. Next, the computation module 34 calculates the image/scan plane position and orientation using the obtained image parameters, the geometric characteristics and the equations (step 62). Finally, the calculated image/scan plane position and orientation are output to the ultrasound data controller module 40 and the program returns to begin processing the next image frame (step 63). This process is repeated continuously to update the output as the probe position and orientation changes between frames during an ultrasound scanning session.

As an alternative to the above described calculation step, the position and orientation of the image/scan plane may be pre-calculated for all possible sets of image parameters. The pre-calculated position and orientation data may be stored in a look-up table. Each time a set of image parameters is obtained, the look-up table may be accessed and the position and orientation data corresponding to the presently acquired image parameters may be selected for output.

Because the above described calculation of image/scan position and orientation may be insensitive to very small position and orientation changes, the PO module 30 may also include an image de-correlation module 38 comprising hardware and/or software. The image de-correlation module 38 processes the ultrasound image using a known image de-correlation algorithm. An example of an image de-correlation algorithm is described in U.S. Pat. No. 5,655,545. Image de-correlation is based upon a known property of the ultrasound modality that states that good correlation exists between consecutive images. Any error accumulations created by de-correlation may be avoided by reevaluating the results obtained from the original calculation of image/scan plane position and orientation.

Figure 5B:
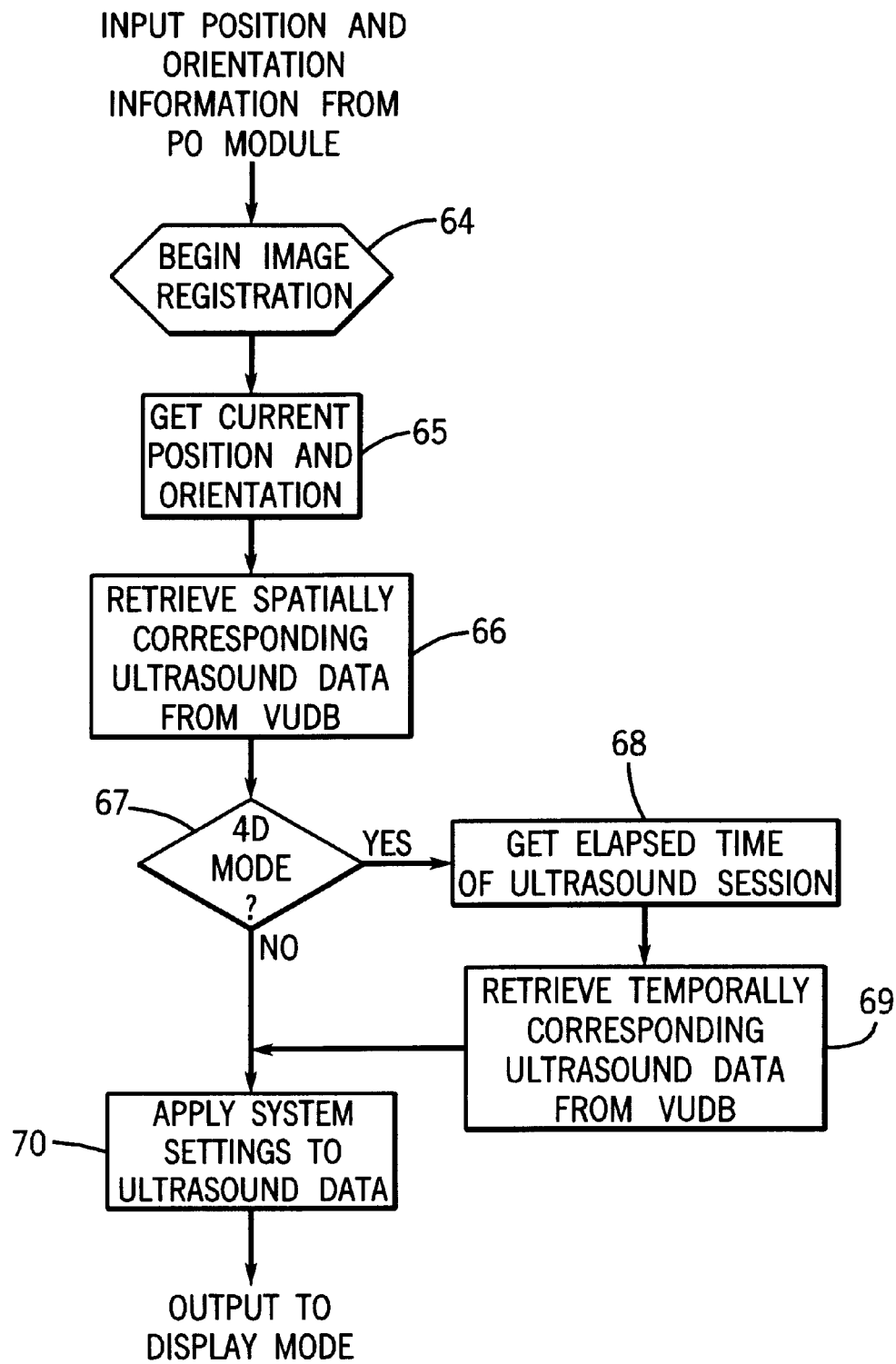
FIG. 5b illustrates a flow chart of a process for retrieving ultrasound data in an ultrasound training system according to a preferred embodiment of the present invention.

FIG. 5b is a flow chart of an exemplary procedure carried out by the ultrasound system 10 for retrieving from VUDB 42 the ultrasound data that spatially (and temporally) corresponds to the position and orientation of the image/scan plane according to a preferred embodiment of the present invention. The ultrasound data controller module 40 receives the position and orientation data from the PO module 30 to perform image registration (step 64). First, the current image/scan plane position and orientation are obtained (step 65). Next, the spatially corresponding ultrasound data is retrieved from the VUDB (step 66). Data retrieval may be carried out in any known manner. For example, the ultrasound data may comprise a number of sets of voxel data. Each set of voxel data comprise a complete ultrasound image frame or image/scan plane. Each set of voxel data is uniquely indexed to an image/scan plane position and orientation. Alternatively, the ultrasound data may be stored as individual voxel data values, not as sets. Each voxel may be individually indexed to a location within a three dimensional volume. In the case of individually indexed voxel data values the ultrasound data controller module 40 would reconstruct a complete image frame based upon the current image/scan plane position and orientation determined by the PO module.

If at step 67 it is determined that the ultrasound system 10 is not operating in a four dimensional playback mode, the current ultrasound system settings are applied to the ultrasound data and the data is output to the display module for display (step 70). The ultrasound system settings may include gain, zoom, focus, power, image direction, freeze frame, etc. If at step 67 it is determined that the ultrasound system 10 is operating in a four-dimensional playback mode, the elapsed time of the ultrasound session is retrieved from a timer (step 68) and the temporally corresponding ultrasound data is retrieved from the VUDB (step 69). In order to provide a four-dimensional playback mode, the VUDB may include data indexed with a time stamp by elapsed time. The spatially and temporally corresponding ultrasound data is then sent to the display module for display after the ultrasound system settings are applied (step 70).

The ultrasound phantom 18 of the preferred embodiment of the present invention wherein the PO module determines actual probe position and orientation has a known three dimensional internal structure that preferably provides a unique cross-section for all planes intersecting the upper and lower surface of the phantom 18. A known internal three dimensional structure is not necessary to implement a PO module that only determines relative changes of probe position and orientation. An example of such a three dimensional structure is described with respect to FIGS. 6, 7a and 7b. The phantom 18 itself may generally be any size and shape, such as that of a human body. For simplicity, however, a simple rectangular or cubic shape has been selected herein for illustrating ultrasound phantom 18. The phantom 18 may be made of any material suitable for ultrasound imaging and is preferably rigid so as to maintain its shape and the geometric relations of its internal structure. The internal structure may be formed of a material that will provide an ultrasound echo characteristic that sharply contrasts with that of the remaining phantom material.

An exemplary embodiment of the ultrasound phantom 18 and its internal structure is illustrated in FIGS. 6, 7a and 7b. FIG. 6 is an orthogonal view of the phantom 18. FIG. 7a is a cross sectional view in the XOZ plane of the phantom 18. FIG. 7b is a cross sectional view in the YOZ plane of the phantom 18. The exemplary internal three dimensional structure has five planar structural elements. The five planar structures are labeled A, B, C, D1 and D2. Planes A and B are parallel and horizontal (i.e., parallel to the XOY plane). The distance between planes A and B is a known distance |AB|. The distance between plane A and the XOY plane is a known distance |OA|. Plane C is perpendicular to the XOZ plane and intersects with the YOZ plane and plane B by the same line parallel to the OY line and forms a known angle ω with the XOY plane. Planes D1 and D2 are parallel to each other and perpendicular to the YOZ plane. Plane D1 intersects with the YOZ plane and plane B by a line parallel to the OX line and forms a known angle ψ with the XOY plane. Distance |AC| is a known distance between planes A and C at the YOZ plane and is equal to distance |AB|. Distance |AD1| is a known distance between planes A and D1 at the XOZ plane and is also equal to distance |AB|. Thus, for this exemplary internal three dimensional structure, there are four known geometric characteristics—distances |AB| and |OA| and angles ψ and ω.

The above described geometric characteristics may be stored in a memory 36 in the PO module 30 or may be stored separately in any known data storage medium. If a number of phantoms are available, each having its own unique set of geometric characteristics, the geometric characteristics may be stored along with an identification of the phantom to which they belong. In this case, the operator of the ultrasound system 10 would select the appropriate phantom and the corresponding geometric characteristics would be retrieved from memory 36 for use by the PO module 30.

Figure 8:
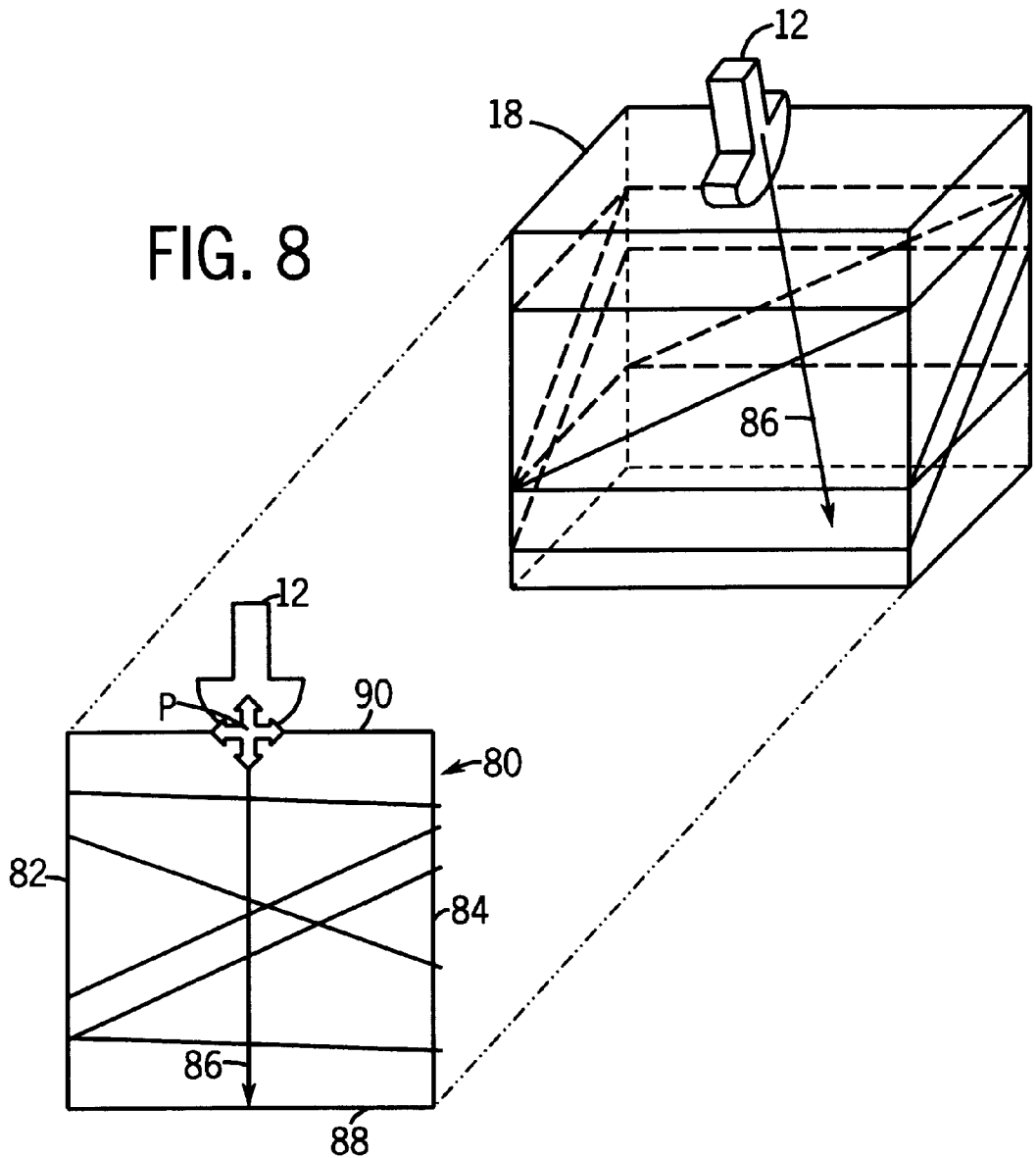
FIG. 8 illustrates an ultrasound probe in an arbitrary probe position and orientation acquiring an ultrasound image of the exemplary phantom of FIG. 6 and the corresponding acquired image/scan plane according to a preferred embodiment of the present invention.

Next, an example is described in connection with FIG. 8 to identify an image/scan plane position and orientation. The procedure of determining the position and orientation of the current image/scan plane begins with the acquisition of a cross sectional sector scan (or a partial volume as the case may be) of an ultrasound image of the phantom 18. FIG. 8 illustrates an orthogonal view of the phantom 18 of FIG. 6 and a cross sectional ultrasound image 80 of the phantom 18, which includes the internal structure described with respect to FIGS. 6, 7a and 7b. The cross sectional image 80 represents one image frame of echo data acquired from an arbitrary position and orientation of the probe 12. The side edges 82 and 84 of the image 80 are parallel to the focal axis 86 of the probe 12 while the upper and lower edges 88 and 90 of the image 80 are perpendicular to the focal axis 86 of the probe 12. A point labeled P indicates the intersection of the focal axis 86 and the upper edge 90. This point P also is the center point of the probe face.

Figure 9A:
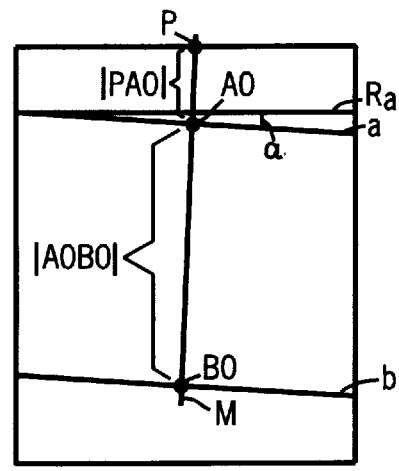
FIG. 9a illustrates a partial view of the cross sectional ultrasound image of FIG. 8 showing image parameters according to a preferred embodiment of the present invention.
Figure 9B:
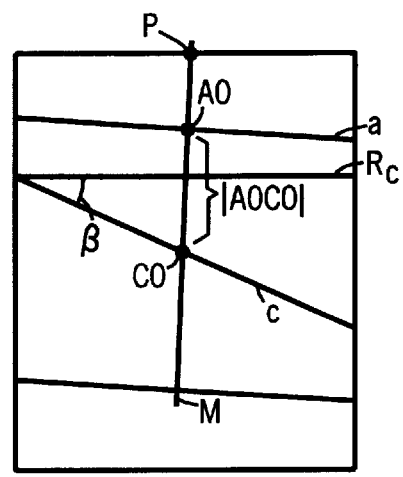
FIG. 9b illustrates a partial view of the cross sectional ultrasound image of FIG. 8 showing image parameters according to a preferred embodiment of the present invention.
Figure 9C:
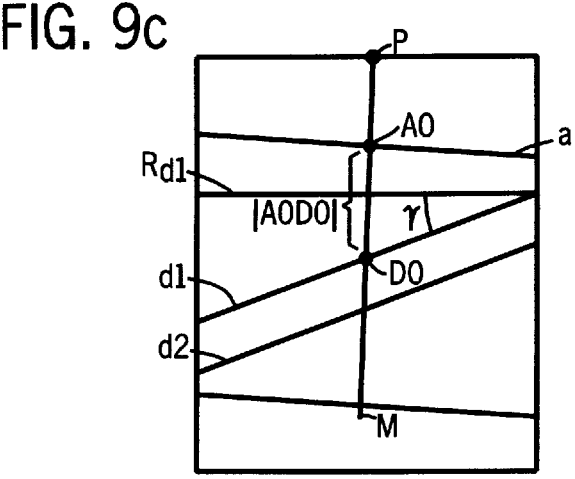
FIG. 9c illustrates a partial view of the cross sectional ultrasound image of FIG. 8 showing image parameters according to a preferred embodiment of the present invention.

To further explain the manner in which the image processing module 32 obtains image parameters, the cross sectional image 80 of FIG. 8 is broken down into three images illustrated in FIGS. 9a, 9b and 9c. FIGS. 9a, 9b and 9c illustrate exemplary image parameters that could be obtained from processing the image 80 of FIG. 8. In FIG. 9a, image processing module 32 detects line a, which is an intersection line of the scanning plane with plane A in the phantom 18. Similarly, the image processing module 32 detects line b, which is an intersection line of the scanning plane with plane B in the phantom 18. Image parameter α is the angle between line a and a reference line Ra that is parallel to the upper and lower edges 88 and 90 of the image 80 or perpendicular to the probe's focal axis 86. Line M is perpendicular to lines a and b and runs through point P. Once the image processing module 32 detects line a and line b, it calculates image parameter angle α. Next, the image processing module 32 projects line M through the image 80 and determines points A0 and B0. Point A0 is the intersection between lines a and M. Point B0 is the intersection between lines B and M. The image processing module 32 then calculates image parameter |A0B0|, which is the distance between points A0 and B0 and image parameter |PA0|, which is the distance between points P and A0.

In FIG. 9b, line c is an intersection line of the scanning plane with plane C. Image parameter β is the angle between line c and a reference line Rc perpendicular to the probes focal axis 86. Point C0 is the intersection point between lines C and M. Image parameter |A0C0| is the distance between points A0 and C0. The image processing module 32 detects line c and calculates reference line Rc and image parameter angle β. As line M is already projected through the image 80, the image processing module next determines point C0 and image parameter distance |A0C0|.

In FIG. 9c, lines d1 and d2 are the intersections lines between the scanning plane and planes D1 and D2, respectively. Image parameter γ is the angle between line d1 and a reference line Rd1 perpendicular to the probes focal axis 86. Point D0 is the intersection between lines d1 and M. Image parameter |A0D0| is the distance between points A0 and D0. The image processing module 32 detects lines d1 and d2, and calculates reference line Rd1. The image processing module 32 then calculates the image parameter angle γ, point D0 and image parameter distance |A0D0|. Thus, the image processing module 32 obtains seven image parameters—distances |A0D0|, |A0D0|, |A0D0| and |PA0| and angles α, β and γ.

The computation module 34 calculates the position and orientation of the image/scan plane using the seven image parameters, |A0B0|, |A0C0|, |A0D0|, |PA0|, α, β and γ, determined by the image processing module 32 along with the four known predetermined geometric characteristics |AB|, |AD1|, ψ and ω of the phantom's internal structure. Position and orientation are calculated using the following predefined equations or relationships. The "in plane" angle of the image scan plane, φ, is defined by the following equation:

$$\phi = \alpha \qquad (eq.\ 1)$$

The "out of plane" angle of the image/scan plane, θ, is defined by the following equation:

$$\theta = \arccos(|AB|/|A0D0|) \qquad (eq.\ 2)$$

The "around the probe axis" angle of the image scan plane, ξ is defined by the following equation:

$$\xi = \arccos(tg(\beta-\alpha)*\cos(\theta)/tg(\omega)) \qquad (eq.\ 3)$$

or may also be defines by the following equation:

$$\xi = \arccos(tg(\gamma-\alpha)*\cos(\theta)/tg(\psi)-90° \qquad (eq.\ 4)$$

Both of the equations given for θ should provide the same result. Errors could be reduced by calculating both equations 3 and 4 and then taking their average. The X, Y and Z coordinates of the center and uppermost pixel or voxel of the image scan plane are defined by the following equations:

$$X = (|AB|-|A0D0|*\cos(\theta))/tg(\omega) \qquad (eq.\ 5)$$

$$Y = (|AB|-|AD0|*\cos(\theta))/tg(\psi) \qquad (eq.\ 6)$$

$$Z = |OA|+|PA0|. \qquad (eq.\ 7)$$

Thus, the computation module 34 will provide an output of three position indicators, coordinates X, Y and Z, and three orientation indicators, angles φ, θ and ξ.

The six position and orientation indicators calculated by the computation module 34 are used by the ultrasound data controller module 40 to retrieve corresponding ultrasound data from the VUDB 42. The ultrasound data stored in the VUDB 42 may be indexed according to similar position and orientation indicators. Alternatively, the computation module 34 may not be used and the seven image parameters-distances |A0D0|, |A0C0|, |A0D0| and |PA0| and angles α, β and γ, may be used directly by the ultrasound data controller module 40 to retrieve corresponding ultrasound data from the VUDB. In this case the ultrasound data may be indexed according to similar image parameters.

The following example provides a complete calculation of image/scan plane position and orientation based upon hypothetical geometric characteristics and image parameters: The phantom 18 includes an internal structure having the following geometric characteristics:

|OA|=10 cm
|AB|=7 cm
ω=30°
ψ=30°

The image parameters determined by the image processing module 32 are:
α=5.4°
β=31°
γ=−21.2°
|PA0|=3.5 cm
|A0D0|=8.5 cm
|A0C0|=5 cm
|A0D0|=4 cm The six parameters (X, Y, Z, φ, θ and ξ) which characterize the image/scan plane position and orientation may be calculated by the computation module 34 in step 60 of FIG. 5 as follows:

1) φ=α=5.4°.
2) θ=arccos (|AB|/|A0B0|)=arccos (7/8.5)=34.56°
3) cos(θ)=cos(34.56)=0.82
4) β−α=31°−5.4°=26.6°
5) tg(β−α)=0.5
6) tg(ω)=tg(ψ)=tg(30°)=0.58
7) ξ1=arccos (tg(β−α)*cos(θ)/tg(ω)=arccos (0.5*0.82/0.58)= arccos (0.7)=45.6°
8) γ−α=−21.2−5.4=−26.6°
9) tg(γ−α)=−0.5
10) ξ2=arccos (tg(γ−α)*cos(θ)/tg(ψ))−90=arccos (−0.5*0.82/0.58)=arccos (0.7)−90=134.4−90=44.4°
11) ξ=(ξ1+ξ2)/2=(44.4+45.6)/2=45°
12) X coordinate of probe center=(|AB|−|A0C0|*cos(θ))/tg (ω)=(7−5* cos(34.56))/tg(30)=(7−5*0.82)/0.58=5 cm
13) Y coordinate of probe center=(|AB|−|A0D0|*cos(θ))/tg (ψ)=(7−4* cos(34.56))/tg(30)=(7−4*0.82)/0.58=6.41 cm
14) Z coordinate of probe center=|OA|+|PA0|=10+3.5=13.5 cm Thus, for this example the image/scan plane position and orientation is defined by the parameter set ( X=5 cm, Y=6.41 cm, Z=13.5 cm, φ=5.4°, θ=34.56° and ξ=45°).

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarding in an illustrative rather than restrictive sense.

What is claimed is:

1. A method for retrieving and displaying previously stored ultrasound data to simulate an ultrasound scanning session, comprising:

acquiring an ultrasound image of an ultrasound phantom;

analyzing the acquired ultrasound image to identify an image attribute;

retrieving a portion of the stored ultrasound data that corresponds to the image attribute; and displaying an ultrasound image based on the retrieved portion of the stored ultrasound data.

2. A method according to claim 1 wherein the image attribute comprises actual position and orientation of the ultrasound image within the ultrasound phantom.

3. A method according to claim 1 wherein the image attribute comprises relative position and orientation of the ultrasound image with respect to a reference position and orientation within the ultrasound phantom.

4. A method according to claim 1 wherein the image attribute comprises unique echo characteristics of volumetric sub-sections of the ultrasound phantom.

5. A method according to claim 1 wherein the ultrasound phantom has a known structure with a set of predetermined geometric characteristics and wherein the step of analyzing comprises:

processing the ultrasound image to obtain at least one image parameter, said image parameter defining the image attribute.

6. A method according to claim 1 wherein the ultrasound phantom has a known structure with a set of predetermined geometric characteristics and wherein the step of analyzing comprises:

processing the ultrasound image to obtain at least one image parameter; and calculating an image position and orientation based on the at least one image parameter and the set of predetermined geometric characteristics, said image position and orientation defining the image attribute.

7. The method according to claim 6, wherein the step of processing the image includes measuring a distance between at least two lines within the image and measuring an angle between at least one line and a reference line associated with the focal axis of the ultrasound image.

8. The method according to claim 6 further comprising:

enhancing the calculation of image position and orientation by performing image de-correlation to detect small changes in position and orientation.

9. The method according to claim 8 further comprising:

correcting for any error accumulations created by de-correlation by reevaluating the original calculation of image position and orientation.

10. The method according to claim 6 further comprising:

selecting a known structure from a number of known structures and retrieving from memory geometric characteristics that correspond to the selected known structure.

11. The method according to claim 1 further comprising the step of timing the elapsed time of the ultrasound session wherein the step of retrieving further comprises retrieving a portion of the previously stored ultrasound data that temporally corresponds to elapsed time of the ultrasound session.

12. The method according to claim 1 wherein the image attribute is a relative change in image position and orientation and the step of analyzing comprises:

analyzing successive acquired ultrasound images and calculating through image de-correlation the relative change in image position and orientation from one acquired ultrasound image to a successive acquired ultrasound image.

13. In an ultrasound imaging system adapted to operate as an ultrasound training system, a subsystem for retrieving and displaying previously stored ultrasound data to simulate an ultrasound scanning session, comprising:

an image analysis module analyzing an acquired ultrasound image of an ultrasound phantom to identify a number of image attributes;

an ultrasound database storing ultrasound data;

an ultrasound data controller module retrieving a portion of the stored ultrasound data that corresponds to the image attributes; and a display displaying an ultrasound image based on the retrieved portion of the stored ultrasound data.

14. An ultrasound imaging system according to claim 13 wherein the image attribute is image position and orientation and the image analysis module comprises:

an image processing module processing the acquired ultrasound image to obtain at least one image parameter; and a computation module calculating position and orientation of the acquired ultrasound image based on the at least one image parameter and a set of known geometric characteristics of the ultrasound phantom.

15. An ultrasound imaging system according to claim 14 further comprising:

a memory storing a sets of geometric characteristics for a number of selectable ultrasound phantoms.

16. An ultrasound imaging system according to claim 13 wherein the image attribute is relative image position and orientation and the image analysis module comprises:

an image de-correlation module performing image de-correlation.

17. An ultrasound imaging system according to claim 14, wherein the image processing module measures a distance between at least two lines within the image and measures an angle between at least one line and a reference line associated with the focal axis of the ultrasound image.

18. An ultrasound imaging system according to claim 14 further comprising:

an image de-correlation module enhancing the calculation of image position and orientation by performing image de-correlation to detect small changes in position and orientation.

19. An ultrasound imaging system according to claim 13 wherein the image attribute identified by the image analysis module comprises unique echo characteristics of volumetric sub-sections of the ultrasound phantom.

20. A method for retrieving and displaying stored anatomical data representing images of anatomical structures comprising:

acquiring an ultrasound image of an ultrasound phantom having a known structure;

processing the acquired ultrasound phantom image to obtain a number of phantom image parameters;

retrieving a portion of the stored anatomical data that corresponds to the obtained phantom image parameters; and displaying an anatomical image based on the retrieved portion of the stored anatomical data.

* * * * *